United States Patent Office 3,585,225
Patented June 15, 1971

3,585,225
PROCESS FOR THE CONTINUOUS PREPARATION OF ADDITION PRODUCTS OF PROPYLENE OXIDE TO CARBOXYLIC ACIDS
Werner Stein, Erkrath-Unterbach, Rhineland, and Wilfried Umbach, Langenfeld, Rhineland, Germany, assignors to Henkel & Cie GmbH, Dusseldorf, Germany
No Drawing. Filed July 14, 1967, Ser. No. 653,319
Claims priority, application Germany, Sept. 1, 1966,
H 60,397
The portion of the term of the patent subsequent to Sept. 22, 1987, has been disclaimed
Int. Cl. C11c 3/10
U.S. Cl. 260—410.6                    10 Claims

ABSTRACT OF THE DISCLOSURE

This invention relates to an improved process for the continuous production of addition products of propylene oxide with organic carboxylic acids which comprises in combination (a) continuously passing a mixture of an organic compound selected from the group consisting of organic carboxylic acids free from reactive hydrogen atoms other than the carboxyl hydrogen atom and addition products of propylene oxide thereof, with propylene oxide in a molar ratio of 1:1 to 1:6 in the presence of from 0.05% to 1.5% by weight of alkali metal, based on said organic compound, of an alkali metal propyloxylation catalyst, through a jacketed reactor having a small cross-section compared to its length, under a pressure at which the reaction mixture is liquid, (b) heating said mixture while passing through said jacketed reactor to attain a maximum temperature of between about 230° C. and 390° C., (c) maintaining said mixture in said jacketed reactor for about 10 to 150 seconds, whereby an addition product is formed, (d) immediately cooling said addition product to a temperature below 180° C. after said addition product leaves said jacketed reactor, and (e) recovering said addition product. More particularly, the invention relates to the preparation of products with a high content of propyleneglycol-1,2 carboxylic acid monoesters in high volume-time-yields.

THE PRIOR ART

It is generally known, that carboxylic acids can be reacted with propylene oxide, in the presence of the alkaline catalysts commonly used for alkoxylations, to give carboxylic acid esters of propyleneglycol and polypropyleneglycols. As it can be derived from the work by Wrigley et al., "Reaction of Ethylene Oxide or Propylene Oxide with Long-Chain Fatty Acids," in the Journal of Am. Oil Chem. Soc., vol. 36, January 1959, pages 34–36, reaction mixtures containing propyleneglycol or polypropyleneglycol monoesters, propyleneglycol or polypropyleneglycol diesters and polypropyleneglycols result therefrom. In Table I page 35, columns 10 and 11, the combination reaction of 1 mol of lauric acid with 1 mol of propylene oxide or 1 mol of stearic acid with 1.1 mol of propylene oxide is indicated as resulting in 40% or 37% of monoesters, 34% or 38% of diesters and 26% or 25% of propylene glycols.

The preparation of the addition products was effected by working at high temperatures, which, however, furnished only insignificant volume-time-yields. With the view to find a possibility to control the reaction progress under preferable formation of monoesters, it is stated, on page 35, left column, of the said periodical, that this can be accomplished by combining various conditions such as low reaction temperatures, increased content of catalysts and more effective stirring.

Since starting with the technical preparation of propylene oxide addition compounds, any number of experiments have been conducted to increase the volume-time-yields by continuously developing and elaborating the processes, as well as to direct the reaction toward the preferred formation of propyleneglycol or polypropyleneglycol monoesters.

According to the German Pat. No. 735,418, the reaction was conducted in a reactor tube with the objective to obtain larger volume-time-yields. The reactor tube was enclosed by a jacket tube, through which oil was circulated to effect and to maintain the reaction temperature. The reaction was conducted in the presence of alkaline catalysts at a pressure of 100 to 200 atmospheres. It was noted in particular, that the temperature of the heating liquid should not exceed a specific degree, as otherwise a pronounced temperature gradient will occur in the interior of the reactor tube. If this occurred, the desired reaction was minimized by the formation of secondary reactions and a useless product would be obtained. As a rule, those reaction temperatures were employed which were substantially below 200° C.

The German Pat. No. 855,111 describes a continuous process for the addition of alkylene oxides, of which propylene oxide is mentioned in particular, to organic compounds, which contain at least one reactive hydrogen atom. According to this process, these starting substances are finely dispersed in an absorption zone and alkylene oxide is continuously introduced at a rate, which maintains the total pressure in the reaction vessel essentially constant. The temperature of the liquid product in the reaction vessel should not exceed 200° C., preferably 175° C.

Furthermore, the published German Auslegeschrift No. 1,180,370 describes a process for the continuous preparation of hydroxyalkylation products, mentioning also the preparation of propylene oxide addition compounds. According to this process, the organic starting compound containing at least one active hydrogen atom, is passed, at temperatures between 20° and 200° C., preferably between 60° and 180° C. into a reaction vessel containing filler bodies and is treated with the respective alkylene oxide at a pressure between 6 and 60 atmospheres. The volume-time-yields obtained by this process are comparatively very low.

In addition to the efforts to increase the volume-time-yields, numerous attempts have been made to conduct the addition of alkylene oxide to carboxylic acids in such a manner that primarily alkyleneglycol carboxylic acid monoesters are obtained. The U.S. Pat. No. 2,910,490 describes a discontinuous process, whereby carboxylic acids are reacted with alkylene oxides, for example with propylene oxide, in the presence of ammonium or alkylammonium halides as catalysts at temperatures of 75° to 175° C. It is especially pointed out in the patent that at reaction temperatures above 175° C., the content of monoesters in the reaction products decreases.

The status of the prior art, as described, shows that until now it has not met with success to conduct the continuous addition of propylene oxide to carboxylic acids in the presence of the usual alkaline catalysts at temperatures substantially above 200° C., to obtain in this way an adequate increase in volume-time-yields. In particular the preparation of products having a high content of propyleneglycol-1,2 carboxylic acid monoester by addition of propylene oxide to carboxylic acids could not be effected with the obtention of greater volume-time-yields.

OBJECTS OF THE INVENTION

An object of the invention is to effect the continuous addition of propylene oxide to carboxylic acids with high volume-time-yields. In particular, in the case of the addition in the molar ratio of 1 to 1, reaction products with a high content of propyleneglycol-1,2 carboxylic acid monoesters are obtained in addition to small amounts of by-products.

Another object of the invention is to develop a process for the continuous production of addition products of propylene oxide with organic carboxylic acids which comprises in combination (a) continuously passing a mixture of an orgnaic compound selected from the group consisting of organic carboxylic acids free from reactive hydrogen atoms other than the carboxyl hydrogen atom and addition products of propylene oxide thereof, with propylene oxide in a molar ratio of 1:1 to 1:6 in the presence of from 0.05% to 1.5% by weight of alkali metal, based on said organic compound, of an alkali metal propyloxylation catalyst, through a jacketed reactor having a small cross-section compared to its length, under a pressure at which the reaction mixture is liquid, (b) heating said mixture while passing through said jacketed reactor to attain a maximum temperature of between about 230° C. and 390° C., (c) maintaining said mixture in said jacketed reactor for about 10 to 150 seconds, whereby an addition product is formed, (d) immediately cooling said addition product to a temperature below 180° C. after said addition product leaves said jacketed reactor, and (e) recovering said addition product.

These and other objects of the invention will become more apparent as the description thereof proceeds.

DESCRIPTION OF THE INVENTION

According to the process of the invention, these objects are achieved in that the reaction is conducted with very short durations and at reaction temperature, the maximum of which substantially exceeds 200° C., provided the following conditions are observed:

(A) Carboxylic acids or addition products of propylene oxide to these acids are passed together with propylene oxide in a molecular ratio of 1:1 to 1:6, in the presence of the usual alkaline catalyst and under a pressure which maintains the reaction mixture in liquid form, through reactors having a small cross-section compared to the length, which are encircled by a heat exchanger jacket.

(B) The mixture is heated in such a manner, that it attains in the reactor, maximum temperatures in the range of between 230° C. and 390° C., preferably between 240° C. and 360° C. The heating can be effected in a manner, that after travelling through the first half of the zone of the reactor enclosed by the heat exchanger jacket, the mixture attains a temperature of 170° C. to 240° C., and that in the second half of this zone, the mixture attains a maximum temperature of between 240° C. and 390° C.

(C) The duration of passage of the reaction mixture through the zone of the reactor encircled by the heat exchanger jacket amounts to about 10 to 150 seconds, preferably 15 to 90 seconds.

(D) The concentration of the catalyst amounts to 0.05% to 1.5% by weight preferably 0.1% to 1.0% by weight, of alkali metal, based on the starting carboxylic acid compound to be propyloxylated.

(E) Immediately after leaving the zone of the reactor encircled by the heat exchanger jacket, the product is cooled to a temperature below 180° C., preferably below 150° C.

Serving as starting organic carboxylic acid compounds for the process of the invention are aliphatic or cycloaliphatic mono- or poly-carboxylic acid, preferably fatty acids having from 6 to 26 carbon atoms, which may be straight or branched, and which may also contain one or several double bonds. Preferred are the natural fatty acids and dimeric fatty acids. Other carboxylic acids obtained through oxidation of hydrocarbons or by carboxylation of olefin or acetylene hydrocarbons are also utilizable.

It is preferable to employ alkanoic acids having 6 to 26 carbon atoms such as lauric acid, mixtures of $C_8$ to $C_{10}$ fatty acids, mixtures of $C_{12}$ to $C_{18}$ fatty acids, etc. alkenoic acids having 6 to 26 carbon atoms such as oleic acid, eurcic acid, etc., and other naturally occurring fatty acids having 6 to 26 carbon atoms.

Furthermore, the addition products of propylene oxide to the above-indicated carboxylic acids can be used as starting substances. This would be considered in all of these cases, where a greater number of propylene oxide moieties are to be added, since, as a rule, due to heat emission, not more than 6 mols of propylene oxide should be added in one process step. Therefore, it is advantageous, to effect the addition in one or several process steps according to the propylene oxide content desired in the end product, whereby the reaction product obtained in the first step serves as starting substance for the next step.

For the process of the invention the usual alkaline catalysts are employed, for example, the alkali metal hydroxides, such as sodium hydroxide, potassium hydroxide; the alkali metal alkanolates or phenolates; the sodium or potassium soaps; or the alkali metals such as sodium or potassium. As a rule, the amount of the catalyst ranges between 0.05% to 1.5% by weight, preferably 0.1% to 1.0% by weight of alkali metal, based on the weight of the starting organic compounds to which propylene oxide is to be added. It is of advantage to use anhydrous catalysts and, in the case of using caustic alkalis, to remove the water formed during the formation of the salt from the mixture. Furthermore, it is advantageous, when using alkali metal alkanolates in lower alkanols, to distill the latter prior to the reaction with propylene oxide.

The pressure in the reactor should be selected so that the reaction mixture will always be in liquid form even at the elevated reaction temperatures of the invention. The pressure ranges advantageously between 50 and 100 atmospheres.

The reaction is conducted in reaction vessels which have a small cross-section in comparison with their length. For example, pressure tubes or reactor/coils having a diameter of about 3 to 12 mm., preferably about 5 to 10 mm., are suitable. Instead of these tubes, so-called slit-ring reactors may be used or reactors with an oval cross-section of an oblate form chosen at random. In any case, the reaction vessels should be of such a dimension as to render a sufficient heat exchange possible.

The length of the reactors may, according to the reaction temperatures indicated and to the short duration dependent thereon, amount, for example, from 10 to 100 meters when a tubular reactor is used.

The specific reaction vessels are encircled by a heat exchanger jacket which, on the one hand, renders a rapid heating of the reaction mixture possible and which, on the other hand, guarantees a sufficiently rapid evolution of the heat developed after the intensely exothermic reaction has started. The heat exchanger may be subdivided into several zones adjusted to various temperatures. However, this measure is not absolutely necessary in fact it has been found frequently advantageous to use a single-zoned heat exchanger. This can be filled with water and adjusted to the desired temperature by means of regulation by pressure. In this manner, due to the high heat of evaporation of the water, a specially effective cooling is attained. However, instead of water, different media may be employed.

Generally, the temperature in the heat exchanger is maintained between about 160° and 250° C.

It has been found advantageous to install a circulating pump in the system of the heat exchanger containing water under pressure, by which the water, gradually cooling in the first half of the zone of the exchanger, is continuously pumped into the second half of the zone where maximum temperatures, caused by the exothermic reaction, are present. Still other technical process measures can be employed, which enable an adjustment of variable temperatures in the exchanger possible.

The course of the temperature during the reaction in a specific apparatus can be controlled by the temperature in the heat exchanger jacket, by the velocity of the flow of the reaction mixture and by the kind and quantity of the catalyst used. It should be taken into account, that the evolution of heat of the reaction mixture is accelerated in proportion as the content of propylene oxide in the reaction mixture is increased. Likewise, at identical molar ratios more heat is evolved in the reaction of low molecular weight starting substances with propylene oxide of equal reaction volumes than in the reaction of high-molecular weight starting substances.

Since, generally, the starting carboxylic acid compounds, the amount of propylene oxide to be added and the catalyst amount are predetermined, the desired temperature progress of the reaction can easily be adjusted by regulating either the flow rate or the duration of passage of the reaction mixture through the reactor and the temperature in the heat exchanger or both. For this purpose, it is only necessary to measure the reaction temperatures in the various sections of the reaction vessel and to adjust either the flow rate or the temperature in the heat exchanger or both to effect the optimum continuous reaction.

The reaction mixture is first heated in such a manner, that in the first half of the zone of the reactor, encircled by the heat exchanger jacket, a reaction temperature of between 170° C. and 240° C. is obtained. The temperature of the heat exchanger is controlled in such a way, that the reaction mixture in the second half of this zone attains a maximum temperature of between 240° C. and 390° C., preferably between 240° C. and 360° C. and thereafter the reaction mixture is cooled.

It may be of advantage to pre-heat the starting materials either separately or combined as a mixture. The flow rate is regulated in such a way that the duration of passage of said mixture through the reaction zone lasts about 10 to 150 seconds, preferably 15 to 90 seconds. Attention should be paid to the fact that, with increased temperature in the heat exchanger, the duration of passage of the reaction mixture through the reaction vessel has to be shortened.

The progress of the reaction of the reactants can easily be followed by determining the course of the curve of the internal temperature of the reactants in the reactor at various points over the length of the reactor. It has been discovered, that it is of advantage for the obtention of an optimal yield of a light colored and odorless reaction product with a high ester content, that the product passage in the reaction zone between the time of attaining the maximum temperature and leaving the heated zone does not amount to more than about 5% to 30% of the total duration of the passage of the reactants through the reaction zone.

Furthermore, it is essential to cool the reaction product immediately after leaving the heated zone to temperatures below 180° C., preferably below 150° C., as, otherwise, an increasing discoloration of the product is noted.

This process of the invention offers very special advantages, when it is desired to obtain propyleneglycol-1,2 carboxylic acid monoesters with high area-time-yields, substantially free of any by-products. This can be accomplished by observing a part of the process conditions in the manner described in the following.

(A) Fatty acids and propylene oxide are passed through the reactor in a molar ratio of 1 to 1.

(B) The maximum temperature prevailing in the reactor is adjusted to range between 230° C. and 290° C.

(C) The duration of passage of the reactants through the zone of the reactor encircled by the heat exchanger amounts to about 10 to 120 seconds.

Since, in certain apparatus, at predetermined reaction temperatures, only the concentration of the catalyst and the duration of passage of the reactants through the reactor zone encircled by a heat exchanger are variable, the composition of the reaction product can be controlled by a suitable selection of these two values. Thus, the content of the unreacted carboxylic acid, which, according to the purpose of the utilization of the products, can be high or low, can be regulated at fixed catalyst concentrations, by varying the duration of passage or, at fixed duration of passage, by varying the catalyst concentration. At lower concentrations of the catalyst, the ratio of monoester to diester in the reaction product is, in principle, independent of the duration of the passage through the reactor. However, at higher concentrations of the catalyst, extremely short durations of passage have to be employed to obtain an optimal mono/diester ratio with regard to a low content of diester. Thereby, an additional advantage is attained in that at an optimal adjusted mono/diester ratio in favor of the monoester is had, and also the glycol or polyglycol content of the reaction product is very insignificant.

With regard to the preperation of polypropyleneglycol carboxylic acid esters, it is advisable, on one hand, as a first step to prepare the corresponding propyleneglycol col-1,2 carboxylic acid monoesters, then, in one or several steps, to add additional amounts of propylene oxide thereto. However, it is also possible to use in the very first step the total amount of propylene oxide up to a molar ratio of 1 to 6. On the other hand, additional amounts of propylene oxide can be added to the products thus obtained in one or several steps, selecting molar ratios of 1:1 to 1:6.

Reaction products having an excellent quality are obtained with high area-time-yields. It is a startling fact, that at high temperatures which until now had been deemed impossible for the realization of end products free of by-products, no decomposition of the reaction products occurs, and that in spite of the short reaction durations a nearly complete reaction takes place. Particularly, since, as it is well known, carboxylic acids, due to their high acidity, manifest a low reaction rate in comparison with propylene oxide.

The products obtained can be employed as textile adjuvants, as emulsifiers in the cosmetic as well as pharmaceutical fields, as raw substances in the field of detergents as well as control means of viscosity in the fields of synthetics.

The following specific embodiments are illustrative of the practice of the invention. They are not, however, to be deemed limitative in any manner.

EXAMPLES

The tests, described in the following, were conducted in a coil reactor, the pressure tube of which had an interior diameter of 9 mm. and a length of 12.5 meters. It was provided with temperature gauges after each 1.25 meters of tube length. The temperature in the water-filled heat exchanger jacket was regulated so that the desired pressure was maintained constant with the aid of a pressure-relief valve. The reaction heat was eliminated by evaporation of the water. The vapor, escaping through this valve, was condensed in a cooling device under normal pressure and then pumped back into the apparatus by means of a pump, in such a manner, that the water level in the pressure jacket remained constant. The water level in the pressure jacket was maintained so that the coil reactor was submerged.

To bring the carboxylic acid, propylene oxide mixture, fed into the reactor, to reaction temperature as rapidly as possible, the water having been condensed during the circulation was pre-heated before introduction into the pressure jacket and additional energy was supplied to the reactor by heating. The carboxylic acid was pre-heated to about 120° C. The water in the heat exchanger pressure jacket was continuously circulated by means of a circulating pump.

The carboxylic acid admixed with the catalyst, and the propylene oxide were fed through separate pipes, by means of dosing pumps, into a mixing chamber, wherein the components were throughly admixed and then immediately passed into the reactor. The pressure in the reactor coils was maintained between 50 and 100 atmospheres.

The reaction product leaving the reactor coil was cooled to below 100° C. in a compression cooler and depressurized in an evaporation vessel.

For the purpose of calculating the duration of passage of the product through the reactor, the individual acids used in the examples were calculated with the following densities:

Lauric acid _____ 0.870
$C_{12}$ to $C_{18}$ fatty acid mixture _____ 0.845
Oleic acid _____ 0.854

The analytical composition of the carboxylic acid, propylene oxide adducts, indicated in the examples, was determined according to the method of Malkemus and Swan, J. Am. Oil Chem. Soc., 34, 342 (1957). The fact that the obtained values did not add up to 10% each time was based on discrepancies in the method of analysis.

EXAMPLE 1

Lauric acid was reacted with such a quantity of a sodium methylate solution, that the acid, after the methanol had been removed by evaporation under vacuum at 80° to 100° C., contained 0.5% by weight of sodium. The catalyst-containing fatty acid and propylene oxide in a molar ratio of 1 to 1 were pumped through the reactor previously described at such a rate, that about 31.5 kg. of an addition product of 1 mol of propylene oxide to 1 mol of lauric acid were produced per hour. The vapor pressure in the heat exchanger pressure jacket was adjusted to 31 atmospheres corresponding with a temperature of 235° C., and the pressure present in the reactor coil was adjusted to 90 to 100 atmospheres. The maximum temperature attained by the reactants in the reactor coil amounted to 254° C., and the duration of passage of the product through the reactor coil lasted about 79 seconds. According to the analysis, the colorless product had the following composition.

0.2% of lauric acid
1.7% of propyleneglycol or polypropyleneglycol
80.4% of propyleneglycol-1,2 monolaurate
14.2% of propyleneglycol-1,2 dilaurate A lauric acid plus 1 mol of propylene oxide adduct, prepared for comparison in the usual discontinuous process method in an autoclave, using 0.5% by weight of sodium as catalyst based on lauric acid, at a temperature of 140° C. to 142° C., and at a reaction duration of four and a half hours, had, according to the analysis, the following composition.

0.1% of lauric acid
9.0% of propyleneglycol or polypropyleneglycol
42.2% of propyleneglycol-1,2 monolaurate
43.3% of propyleneglycol-1,2 dilaurate

EXAMPLE 2

Lauric acid was reacted with such a quantity of a sodium methylate solution that the acid, after the methanol had been removed by evaporation under vacuum at 80° to 100° C., contained 0.3% by weight of sodium. The catalyst-containing fatty acid and propylene oxide in a molar ratio of 1 to 1 were pumped through the previously described reactor at such a rate, that about 37 kg. of an addition product of 1 mol of propylene oxide to 1 mol of lauric acid were produced per hour. The vapor pressure in the heat exchanger pressure jacket was adjusted to 31.5 atmospheres corresponding with a temperature of 236° C., and the pressure present in the reactor coil was adjusted to 80 to 90 atmospheres. The maximum temperature attained by the reactants in the reactor coil amounted to 252° C. and the duration of passage of the product through the reactor coil last about 67 seconds. The colorless product had, according to analysis, the following composition.

4.5% of lauric acid
0.1% of propyleneglycol or polypropyleneglycol
86.7% of propyleneglycol-1,2 monolaurate
7.1% of propyleneglycol-1,2 dilaurate A lauric acid plus 1 mol of propylene oxide adduct, prepared for composition in the usual discontinuous process method in an autoclave, using 0.3% by weight of sodium as catalyst, based on the lauric acid, at a temperature of 134° C. to 142° C., and at a reaction duration of three and three quarter hours had, according to analysis, the following composition.

0.1% of lauric acid
9.1% of propyleneglycol or polypropyleneglycol
43.7% of propyleneglycol-1,2 monolaurate
43.4% of propyleneglycol-1,2 dilaurate

EXAMPLE 3

Lauric acid was reacted with such a quantity of a sodium methylate solution that the acid, after the methanol had been removed by evaporation under vacuum at 80° to 100° C., contained 0.65% by weight of sodium. The catalyst-containing fatty acid and propylene oxide in a molar ratio of 1 to 1 were pumped through the said reactor at such a rate, that about 51.7 kg. of an addition product of 1 mol of propylene oxide to 1 mol of lauric acid were produced per hour. The vapor pressure in the heat exchanger pressure jacket was adjusted to 31.2 atmospheres corresponding with a temperature of 235° C., and the pressure present in the reactor coil was adjusted to 90–100 atmospheres. The maximum temperature attained by the reactants in the reactor coil amounted to 256° C., and the duration of passage of the product through the reactor coil lasted about 48 seconds. The colorless product had, according to analysis, the following composition.

2.7% of lauric acid
0.2% of propyleneglycol or polypropyleneglycol
82.6% of propyleneglycol-1,2 monolaurate
9.7% of propyleneglycol-1,2 dilaurate A lauric acid plus 1 mol of propylene oxide adduct, prepared for comparison in the usual discontinuous process method in an autoclave, using 0.65% by weight of sodium as catalyst based on lauric acid, at a temperature of 138° C. to 142° C., and at a reaction duration of three hours, had, according to analysis, the following composition.

0.1% of lauric acid
8.1% of propyleneglycol or polypropyleneglycol
44.2% of propyleneglycol-1,2-monolaurate
44.4% of propyleneglycol-1,2 dilaurate

EXAMPLE 4

A $C_{12}$ to $C_{18}$ fatty acid mixture with an acid number of 251.2, and an average molecule weight of 223 (chain length distribution: 45.5% of $C_{12}$, 18.5% of $C_{14}$, 13% of $C_{16}$ and 23% of $C_{18}$), was reacted with such a quantity of a sodium methylate solution, that the acid mixture, after the methanol had been removed by evaporation under vacuum at 80° to 100° C., contained 0.3% by weight of sodium. The catalyst-containing fatty acid mixture and propylene oxide in a molar ratio of 1 to 1 were pumped through the said reactor at such a rate, that about 35.2 kg. of an addition product of 1 mol of propylene oxide to 1 mol of the fatty acid mixture were produced per hour. The vapor pressure in the heat exchanger pressure jacket was adjusted to 29 atmospheres corresponding with a temperature of 231° C., and the pressure present in the reactor coil was adjusted to 80 to 100 atmospheres. The maximum temperature attained by the reactants in the reactor coil amounted to 251° C., and the duration of passage of the product through the reactor coil lasted about 69 seconds. The colorless product had, according to analysis, the following composition.

0.5% of $C_{12}$ to $C_{18}$ fatty acid
0.6% of propyleneglycol or polypropyleneglycol
82.1% of propyleneglycol-1,2 mono-$C_{12}$ to $C_{18}$ fatty acid ester
8.4% of propyleneglycol-1,2 di-$C_{12}$ to $C_{18}$ fatty acid ester

EXAMPLE 5

Oleic acid, with an acid number of 201.7 and an iodine number of 90.1, was reacted with such a quantity of a sodium methylate solution, that the acid, after the methanol had been removed by evaporation under vacuum at 80° to 100° C., contained 0.3% by weight of sodium. The catalyst-containing acid and propylene oxide in a molar ratio of 1 to 1 were pumped through the said reactor at such a rate, that about 34 kg. of an addition product of 1 mol of propylene oxide to 1 mol of oleic acid were produced per hour. The vapor pressure in the heat exchanger pressure jacket was adjusted to 28.2 atmospheres, corresponding with a temperature of 229° C., and the pressure present in the reactor coil was adjusted to 70 to 90 atmospheres. The maximum temperature attained by the reactants in the reactor coil amounted to 246° C., and the duration of passage of the product through the reactor coil lasted about 72 seconds. The nearly colorless product had, according to analysis, the following composition.

6.1% of oleic acid
0.6% of propyleneglycol or polypropyleneglycol
82.7% of propyleneglycol-1,2 monooleate
10.1% of propyleneglycol-1,2 dioleate

EXAMPLE 6

Erucic acid, still containing a small amount of a $C_{24}$ fatty acid, was reacted with such a quantity of a sodium methylate solution, that the acid, after the methanol had been removed by evaporation under vacuum at 80° to 100° C., contained 0.5% by weight of sodium. The catalyst-containing fatty acid and propylene oxide in a molar ratio of 1 to 1 were pumped through the previously described reactor at such a rate, that about 34 kg. of an addition product of 1 mol of propylene oxide to 1 mol of erucic acid were produced per hour. The vapor pressure in the heat exchanger pressure jacket was adjusted to 29.6 atmospheres corresponding with a temperature of 232° C., and the pressure present in the reactor coil was adjusted to 90 to 100 atmospheres. The maximum temperature attained by the reactants in the reactor coil amounted to 240° C., and the duration of passage of the product through the reactor coil lasted about 72 seconds.

For the purpose of calculating the duration of passage of the product through the reactor coil, the erucic acid was calculated with a density of 0.847.

The product had a yellow color and, according to analysis, the following composition.

3.4% of erucic acid
1.4% of propyleneglycol or polypropyleneglycol
81.3% of propyleneglycol-1,2 monoerucate
9.0% of propyleneglycol-1,2 dierucate The advantage of the process of the invention consists in that it is possible, by following the process, to produce addition products of propylene oxide to carboxylic acids with especially significant area-time-yields. Particularly advantageous is the process of the invention with regard to the preparation of propyleneglycol-1,2 carboxylic acid monoesters, which can be produced not only with high area-time-yields, but at the same time free of by-products in an extraordinary degree.

The preceding specific embodiments are illustrative of the process of the invention. It is to be understood, however, that other expedients known to those skilled in the art may be employed without departing from the spirit of the invention or the scope of the appended claims.

We claim:
1. A process for the continuous production of addition products of propylene oxide with organic carboxylic acids which consists essentially of the steps of (a) continuously passing a mixture of an organic compound selected from the group consisting of organic carboxylic acids free from reactive hydrogen atoms other than the carboxyl hydrogen atom and addition products of propylene oxide thereof, with propylene oxide in a molar ratio of 1:1 to 1:6 in the presence of from 0.05% to 1.5% by weight of alkali metal, based on said organic compound, of an alkali metal propyloxylation catalyst, through a jacketed reactor having a small cross-section compared to its length, under a pressure at which the reaction mixture is liquid, (b) heating said mixture while passing through said jacketed reactor to attain a maximum temperature of between about 230° C. and 390° C., (c) maintaining said mixture in said jacketed reactor for about 10 to 150 seconds whereby an addition product is formed, (d) immediately cooling said addition product to a temperature below 180° C. after said addition product leaves said jacketed reactor, and (e) recovering said addition product.

2. The process of claim 1, step (a) wherein said alkali metal propyloxylation catalyst is present in an amount of between 0.1% and 1.0% by weight of alkali metal, based on said organic compound.

3. The process of claim 1, step (b) wherein said reaction mixture is heated to attain a maximum temperature of between 240° C. and 360° C.

4. The process of claim 1, step (c) wherein said mixture is maintained in said jacketed reactor for between about 15 and 90 seconds.

5. The process of claim 1, step (d) wherein said addition product is immediately cooled to a temperature below 150° C. after said product leaves said jacketed reactor.

6. The process of claim 1, step (a) wherein said mixture is maintained at a pressure of between 50 and 100 atmospheres.

7. The process of claim 1, step (b) wherein said mixture is heated to such a degree, that after passing through the first half of said jacketed reactor, a temperature of between 170° and 240° C. is attained, and that while passing through the second half of said jacketed reactor, a maximum temperature of between 240° C. and 390° C. is attained.

8. The process of claim 1 wherein a mixture of an organic carboxylic acid free from reactive hydrogen atoms other than the carboxyl hydrogen atoms with propylene oxide in a molar ratio of 1:1 is utilized, the maximum temperature attained of said mixture is between 230° C. and 290° C., said mixture is maintained in said jacketed reactor for about 10 to 120 seconds and predominately propyleneglycol organic carboxylic acid monoesters are recovered.

9. The process of claim 1 wherein the interval between the obtention of said maximum temperature and the time said mixture leaves said jacketed reactor is between about 5% to 30% of the total duration of time said mixture is maintained in said jacketed reactor.

10. The process of claim 1 wherein said organic carboxylic acid free from reactive hydrogen atoms other than the carboxyl hydrogen atom is selected from the group consisting of alkanoic acids having 6 to 26 carbon atoms and alkenoic acids having 6 to 26 carbon atoms.

References Cited

UNITED STATES PATENTS

| 2,634,278 | 4/1953 | Kuhrt | 260—410.7 |
| 2,910,490 | 10/1959 | Malkemus | 260—410.6 |
| 3,433,824 | 3/1969 | Horsley | 260—486 |

LORRAINE A. WEINBERGER, Primary Examiner

R. S. WEISSBERG Assistant Examiner

U.S. Cl. X.R.

260—468, 485, 486, 496